United States Patent
Ryu et al.

(10) Patent No.: US 11,296,390 B2
(45) Date of Patent: Apr. 5, 2022

(54) CYLINDRICAL BATTERY CELL HAVING CONNECTION CAP

(71) Applicant: LG CHEM, LTD., Seoul (KR)

(72) Inventors: Jae-Uk Ryu, Daejeon (KR); Dal-Mo Kang, Daejeon (KR); Su-Chang Kim, Daejeon (KR); Jeong-O Mun, Daejeon (KR); Jae-Min Yoo, Daejeon (KR); Ji-Su Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 93 days.

(21) Appl. No.: 16/603,450

(22) PCT Filed: Oct. 2, 2018

(86) PCT No.: PCT/KR2018/011710
§ 371 (c)(1),
(2) Date: Oct. 7, 2019

(87) PCT Pub. No.: WO2019/074234
PCT Pub. Date: Apr. 18, 2019

(65) Prior Publication Data
US 2020/0395587 A1 Dec. 17, 2020

(30) Foreign Application Priority Data

Oct. 10, 2017 (KR) .......................... 10-2017-0129129

(51) Int. Cl.
*H01M 10/04* (2006.01)
*H01M 50/502* (2021.01)
(Continued)

(52) U.S. Cl.
CPC ..... *H01M 50/502* (2021.01); *H01M 10/0422* (2013.01); *H01M 10/0436* (2013.01);
(Continued)

(58) Field of Classification Search
CPC .. H01M 50/543; H01M 10/052; H01M 50/20; H01M 10/0587; H01M 50/155;
(Continued)

(56) References Cited

U.S. PATENT DOCUMENTS

2004/0115519 A1 6/2004 Lee
2006/0019160 A1 1/2006 Han
(Continued)

FOREIGN PATENT DOCUMENTS

CN        1713416 A    12/2005
CN    101944633 A    1/2011
(Continued)

OTHER PUBLICATIONS

International Search Report (PCT/ISA/237) issued in PCT/KR2018/011710, dated Jan. 18, 2019.
(Continued)

*Primary Examiner* — Jonathan G Jelsma
*Assistant Examiner* — Omar M Kekia
(74) *Attorney, Agent, or Firm* — Birch, Stewart, Kolasch & Birch, LLP

(57) ABSTRACT

A cylindrical battery cell including a first electrode terminal and a second electrode terminal having different polarities: an electrode assembly in which a positive electrode, a negative electrode and a separator interposed between the positive electrode and the negative electrode are wound; a battery case configured to include the electrode assembly therein in a state of being impregnated with an electrolytic solution; a cap assembly mounted to a top end of the battery case; and a connection cap including a cap housing loaded on the battery case and the cap assembly and having an insulating material, and a first connection plate and a second connection plate placed on the cap housing and electrically (Continued)

connected to the first electrode terminal and the second electrode terminal, respectively.

15 Claims, 9 Drawing Sheets

(51) Int. Cl.
| | | |
|---|---|---|
| *H01M 10/052* | (2010.01) | |
| *H01M 10/0587* | (2010.01) | |
| *H01M 50/107* | (2021.01) | |
| *H01M 50/147* | (2021.01) | |
| *H01M 50/155* | (2021.01) | |
| *H01M 50/213* | (2021.01) | |
| *H01M 50/543* | (2021.01) | |

(52) U.S. Cl.
CPC ..... *H01M 10/052* (2013.01); *H01M 10/0587* (2013.01); *H01M 50/107* (2021.01); *H01M 50/147* (2021.01); *H01M 50/155* (2021.01); *H01M 50/213* (2021.01); *H01M 50/543* (2021.01); *H01M 2220/30* (2013.01)

(58) Field of Classification Search
CPC ............ H01M 50/502; H01M 50/213; H01M 50/147; H01M 50/50; H01M 10/04; H01M 50/107; H01M 10/0436; H01M 2220/30; H01M 10/0422; Y02E 60/10
USPC .......................................................... 429/94
See application file for complete search history.

(56) References Cited

U.S. PATENT DOCUMENTS

| | | | |
|---|---|---|---|
| 2006/0093904 A1* | 5/2006 | Cheon | H01M 50/171 |
| | | | 429/163 |
| 2007/0196731 A1 | 8/2007 | Hyung et al. | |
| 2008/0085447 A1 | 4/2008 | Kim et al. | |
| 2008/0182162 A1 | 7/2008 | Kim | |
| 2009/0004558 A1 | 1/2009 | Miyazaki et al. | |
| 2009/0022206 A1* | 1/2009 | Shibuya | B60L 50/66 |
| | | | 374/208 |
| 2009/0087733 A1 | 4/2009 | Yoon et al. | |
| 2009/0111015 A1* | 4/2009 | Wood | H01M 50/20 |
| | | | 429/164 |
| 2009/0130554 A1 | 5/2009 | Jang et al. | |
| 2010/0159289 A1 | 6/2010 | Kim et al. | |
| 2012/0094171 A1* | 4/2012 | Guen | H01M 50/172 |
| | | | 429/179 |
| 2013/0236774 A1 | 9/2013 | Liu | |
| 2013/0316202 A1 | 11/2013 | Bang et al. | |
| 2014/0193684 A1 | 7/2014 | Kwag | |
| 2014/0377592 A1 | 12/2014 | Pyzza et al. | |
| 2015/0072186 A1* | 3/2015 | Guen | H01M 50/572 |
| | | | 429/61 |
| 2015/0086834 A1 | 3/2015 | Cho | |
| 2016/0260959 A1 | 9/2016 | Guen | |
| 2016/0260997 A1* | 9/2016 | Lee | H01M 50/15 |
| 2018/0226628 A1 | 8/2018 | Takasu et al. | |

FOREIGN PATENT DOCUMENTS

| | | |
|---|---|---|
| CN | 103915587 A | 7/2014 |
| CN | 205429070 U | 8/2016 |
| CN | 206685445 U | 11/2017 |
| JP | 54-12830 A | 1/1979 |
| JP | 9-63552 A | 3/1997 |
| JP | 2005-520313 A | 7/2005 |
| JP | 2007-265846 A | 10/2007 |
| JP | 2010-153378 A | 7/2010 |
| JP | 4845362 B2 | 12/2011 |
| JP | 2012-128955 A | 7/2012 |
| JP | 4974734 B2 | 7/2012 |
| JP | 5153230 B2 | 3/2013 |
| JP | 2017-73326 A | 4/2017 |
| KR | 10-2007-0082969 A | 8/2007 |
| KR | 10-2012-0133203 A | 12/2012 |
| KR | 10-1299139 B1 | 8/2013 |
| KR | 10-2016-0107061 A | 9/2016 |
| KR | 10-2016-0108857 A | 9/2016 |
| KR | 10-2017-0009592 A | 1/2017 |
| WO | WO 2017/035173 A1 | 3/2017 |

OTHER PUBLICATIONS

Extended European Search Report dated Mar. 3, 2020 for European Application No. 18865434.7.
English Machine Translation of JP-2012-128955-A, dated July 5, 2012.
Indian Office Action dated Jul. 14, 2021 for Application No. 202017014874.

* cited by examiner

CYLINDRICAL BATTERY CELL HAVING CONNECTION CAP

TECHNICAL FIELD

The present disclosure relates to a cylindrical battery cell having a connection cap, and more particularly, to a cylindrical battery cell having improved manufacturing efficiency by facilitating a welding process.

The present application claims priority to Korean Patent Application No. 10-2017-0129129 filed on Oct. 10, 2017 in the Republic of Korea, the disclosures of which are incorporated herein by reference.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance secondary batteries allowing repeated charging and discharging are being actively studied.

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery is generally classified into a cylindrical battery, a rectangular battery and a pouch-type battery depending on the shape of a battery case that includes an electrode assembly having a positive electrode, a separator and a negative electrode. Here, due to the miniaturization trend of devices, the rectangular batteries and the pouch-type batteries are demanded more and more.

Recently, for simplified process and improved energy density, when a battery module having a plurality of cylindrical battery cells is manufactured, both a positive electrode terminal and a negative electrode terminal are connected to a bus bar at a top surface of the cylindrical battery cell.

FIG. 1 is a schematic perspective view showing a section of a general cylindrical battery cell according to the prior art.

Referring to FIG. 1, the cylindrical battery cell 1 includes an electrode assembly 9 including a negative electrode 3, a positive electrode 5, and a separator 7 disposed between the negative electrode 3 and the positive electrode 5. Also, the electrode assembly 9 may be located inside a battery case 15, and an electrolyte (not shown) is injected into the battery case 15 so that the negative electrode 3, the positive electrode 5 and the separator 7 are impregnated with the electrolyte, thereby manufacturing the cylindrical battery cell 1.

In addition, conductive lead members 10, 13 for collecting the current generated when the battery is operated may be attached to the negative electrode 3 and the positive electrode 5, respectively. The lead members 10, 13 may induce the current generated at the positive electrode 5 and the negative electrode 3 to the positive electrode terminal 6 and the negative electrode terminal 8, respectively.

However, since the electrode terminal 8 formed at an outer circumference of the top end of the conventional cylindrical battery cell 1 has a very small width, the welding process for a bus bar serving as a conductive metal member is very difficult. Accordingly, the bonding process of electrically connecting the plurality of cylindrical battery cells is very difficult, takes a long time and causes a defect rate to be increased, thereby resulting in the increase of manufacture costs.

DISCLOSURE

Technical Problem

The present disclosure is designed to solve the problems of the related art, and therefore the present disclosure is directed to providing a cylindrical battery cell having improved manufacturing efficiency by facilitating a welding process.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a cylindrical battery cell, which includes a first electrode terminal and a second electrode terminal formed at a top outer circumference and a center portion of the cylindrical battery cell and having different polarities, the cylindrical battery cell comprising:

an electrode assembly in which a positive electrode, a negative electrode and a separator interposed between the positive electrode and the negative electrode are wound;

a battery case configured to include the electrode assembly therein in a state of being impregnated with an electrolytic solution;

a cap assembly mounted to an open top end of the battery case; and a connection cap including a cap housing loaded on the battery case and the cap assembly and having an insulating material, and a first connection plate and a second connection plate placed on the cap housing and electrically connected to the first electrode terminal and the second electrode terminal, respectively.

Here, the cap housing may have an accommodation portion formed at a top surface thereof to be recessed downward so that the first connection plate and the second connection plate are accommodated therein.

Also, the accommodation portion may include a first loading portion configured to accommodate and fix the first connection plate; a second loading portion configured to accommodate and fix the second connection plate; and a partitioning portion formed between the first loading portion and the second loading portion to partition the first loading portion and the second loading portion.

Moreover, the cap housing may include an outer circumferential exposing portion opened so that the first electrode terminal formed at the outer circumference is exposed to the outside; and a central exposing portion opened so that the second electrode terminal formed at the center portion is exposed to the outside.

In addition, the first connection plate and the second connection plate may include an electrode terminal welding portion formed respectively at the first electrode terminal and the second electrode terminal so that a lower surface of the electrode terminal welding portion directly contacts an outer surface of the electrode terminal; and a bus bar welding portion connected to one end of the electrode terminal welding portion so that a top surface of the bus bar welding portion is exposed upward.

Moreover, the connection cap may further include a fixing cover coupled and fixed to the cap housing to cover and fix a portion of the top surface of the first connection plate and the second connection plate.

Also, the cap housing may have a guide protrusion protruding upward to guide a fixed location of the fixing cover.

Further, fixing cover may have a fixing hole formed to be opened so that the guide protrusion is inserted therein.

In addition, the fixing cover may include an outer circumferential welding groove opened so that an electrode terminal welding portion of the first connection plate is exposed to the outside; and a central welding hole formed so that an electrode terminal welding portion of the second connection plate is exposed to the outside.

Moreover, a hooking protrusion protruding toward the center may be formed at the accommodation portion of the cap housing to prevent the fixing cover from deviating from the accommodation portion.

Also, an arrangement guiding portion may be formed at an outer wall of the cap housing to guide arrangement of a plurality of cylindrical battery cells.

Further, the arrangement guiding portion may include flat ridge structures formed at outer walls of both left and right sides of the cap housing and having one flat surface in a left and right direction to guide arrangement of the plurality of cylindrical battery cells in the left and right direction.

In addition, a triangular protruding structure may be formed at an outer sidewall of the cap housing in a front and rear direction to guide arrangement of the plurality of cylindrical battery cells in the front and rear direction.

In another aspect of the present disclosure, there is also provided a battery module, comprising a plurality of cylindrical battery cells according to the present disclosure.

In another aspect of the present disclosure, there is also provided an electronic device, comprising the battery module according to the present disclosure.

Advantageous Effects

According to an embodiment of the present disclosure, since the cylindrical battery cell of the present disclosure includes a connection cap having a first connection plate and a second connection plate, it is possible to smoothly perform the welding process for electrically connecting the electrode terminal and the bus bar.

Thus, the cylindrical battery cell of the present disclosure may not only increase the efficiency of the manufacturing process but also reduce the defective rate effectively, thereby resultantly reducing the manufacturing cost.

Also, according to an embodiment of the present disclosure, since the cap housing may allow the first connection plate and the second connection plate to be easily loaded on an upper portion of the cylindrical battery cell and also allows the first connection plate and the second connection plate to stably keep the loaded state, the process of bonding the first connection plate and the second connection plate to the cylindrical battery cell or the bus bar may be easily performed.

Further, according to an embodiment of the present disclosure, since the cap housing of the present disclosure may not only guide the arrangement of the first connection plate and the second connection plate so as to be electrically connected to the first electrode terminal and the second electrode terminal, respectively, but also the first connection plate and the second connection plate may be fixed without movement during the welding process, it is possible to improve the welding efficiency.

In addition, according to an embodiment of the present invention, since the fixing cover of the present disclosure may be fixed to an accurate position just by inserting the guide protrusion formed at the cap housing into the fixing hole correctly, it is possible to effectively increase the manufacturing efficiency.

Also, according to an embodiment of the present disclosure, since the cap housing of the present disclosure has a separate hooking protrusion formed to fix the fixing cover, the fixing cover may be stably fixed to the accommodation portion of the cap housing. In addition, since the stopper formed at the hooking protrusion may guide the fixing cover to be fixed at an accurate position, it is possible to improve the accuracy of the welding work and reduce the defect rate afterward.

Further, according to an embodiment of the present disclosure, in the battery module of the present disclosure, cylindrical battery cells may be aligned accurately and easily in the left and right direction and in the front and rear direction by using the arrangement guiding portion formed at each cylindrical battery cell.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 2:
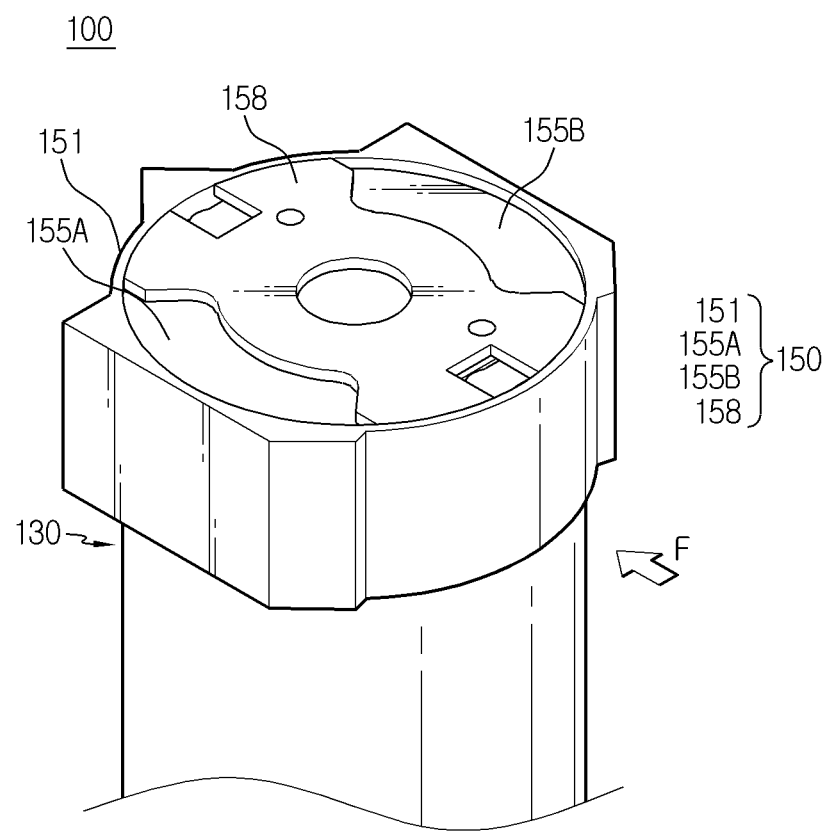
FIG. 2 is a perspective view schematically showing a cylindrical battery cell according to an embodiment of the present disclosure.
Figure 3:
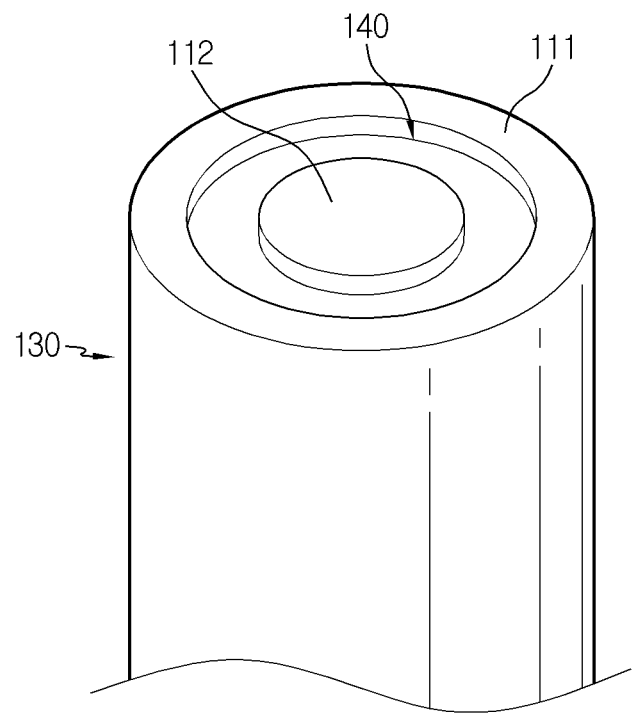
FIG. 3 is a partial perspective view schematically showing some components of the cylindrical battery cell according to an embodiment of the present disclosure.

FIG. 2 is a perspective view schematically showing a cylindrical battery cell according to an embodiment of the present disclosure. FIG. 3 is a partial perspective view schematically showing some components of the cylindrical battery cell according to an embodiment of the present disclosure. Also, FIG. 4 is a partial perspective view schematically showing some components of the cylindrical battery cell according to an embodiment of the present disclosure.

Figure 4:
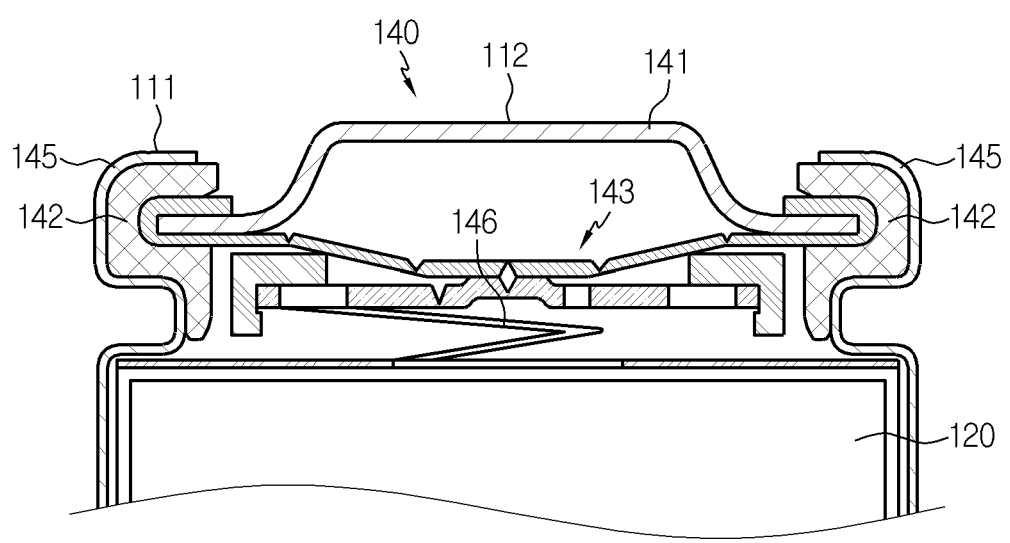
FIG. 4 is a partial perspective view schematically showing some components of the cylindrical battery cell according to an embodiment of the present disclosure.

Referring to FIGS. 2 to 4, a cylindrical battery cell 100 of the present disclosure includes a battery case 130, an electrode assembly 120, a cap assembly 140, and a connection cap 150.

Here, the battery case 130 is made of a lightweight conductive metal material such as aluminum, stainless steel, or an alloy thereof. Also, the battery case 130 may have an opening opened at a top end thereof and a closed cylindrical bottom opposite thereto, as viewed in the F direction. In addition, as described above, a plating layer is formed on the inner surface and the outer surface of the battery case 130.

Here, the terms indicating directions such as front, rear, left, right, upper and lower directions may be changed depending on the position of an observer or the shape of an object. For the sake of convenience of description, in the present specification, directions are classified into front, rear, left, right, upper and lower directions, based on the F direction.

In addition, the electrode assembly 120 may be included in the inner space of the battery case 130 in a state of being impregnated with an electrolytic solution.

Also, the electrode assembly 120 may be formed so that a positive electrode, a negative electrode, and a separator interposed between the positive electrode and the negative electrode are wound. At this time, since the electrode assembly 120 is wound and arranged in a jelly roll form, the electrode assembly 120 is also called a jelly roll.

In addition, the electrode plates of the electrode assembly 120 are formed by applying an active material slurry to a current collector coated. The slurry is usually formed by stirring a solvent to which a granular active material, a conductive material, a binder and a plasticizer are added.

Further, the electrode assembly 120 may have an uncoated portion at a start end and a final end of the current collector in a direction alone which the electrode plates are wound, and the uncoated portion refers to a portion that is not coated with the slurry. An electrode lead (only a positive electrode lead 146 is depicted in FIG. 4) corresponding to each electrode plate may be attached to the uncoated portion.

Generally, the positive electrode lead 146 is electrically connected to the cap assembly 140 mounted on the open top end of the electrode assembly 120, and a negative electrode lead (not shown) is connected to the electrode assembly 120 to electrically connect to the battery case 130.

Also, the cap assembly 140 includes a top cap 141, a gasket 142, a safety vent 143, a safety element, a current blocking member, and an insulating member.

Moreover, a crimping portion 145 may be formed at the top end of the battery case 130. The crimping portion 145 is a portion where the cap assembly 140 is mounted to the open top end of the battery case 130. More specifically, the crimping portion 145 may be formed to surround the gasket 142 located at an inner side of the cap assembly 140. Also, a crimping and pressing process is performed to mount the cap assembly 140 onto the battery case 130.

In addition, the top surface of the crimping portion 145 of the battery case 130 may be used as the first electrode terminal 111. That is, the top outer circumference of the cylindrical battery cell 100 may be formed as the first electrode terminal 111. For example, as shown in FIG. 3, a circular outer circumference of the top end of the cylindrical battery cell 100 may serve as the first electrode terminal 111, which is electrically connected to the negative electrode of the electrode assembly 120.

Here, the top cap 141 is disposed at the top portion of the cap assembly 140 to protrude upward, and a second electrode terminal 112 electrically connected to the positive electrode of the electrode assembly 120 to conduct a current to the outside may be formed at the top cap 141.

Specifically, the second electrode terminal 112 may be formed at the top surface of the top cap 141 of the cap assembly 140. That is, as shown in FIG. 4, the top cap 141 may serve as the second electrode terminal 112 electrically connected to the positive electrode of the electrode assembly. Further, the top cap 141 may be made of a metal material such as stainless steel or aluminum.

In addition, the cylindrical battery cell 100 according to the present disclosure may be a lithium secondary battery. Other components of the lithium secondary battery will be described in detail below.

In general, the lithium secondary battery includes a positive electrode, a negative electrode, a separator, and a non-aqueous electrolytic solution containing a lithium salt. The positive electrode is prepared, for example, by applying a mixture of a positive electrode active material, a conductive material and a binder onto a positive electrode current collector and then drying the mixture. If necessary, a filler may be further added. The negative electrode is also fabricated by applying a negative electrode material onto a negative electrode current collector and drying the negative electrode material, and if necessary, the components as described above may be further included.

Figure 5:
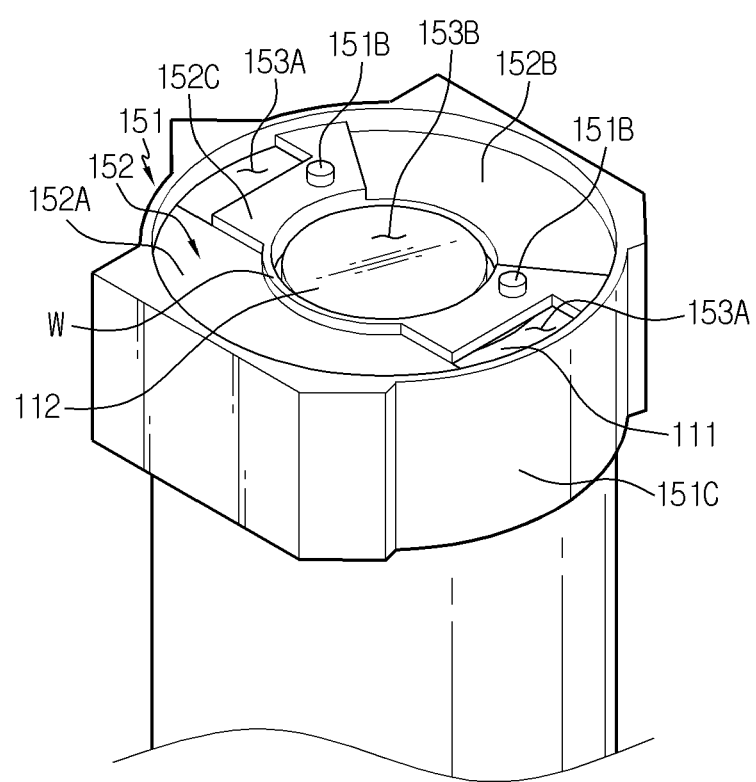
FIG. 5 is a partial perspective view schematically showing some components of the cylindrical battery cell according to an embodiment of the present disclosure.

FIG. 5 is a partial perspective view schematically showing some components of the cylindrical battery cell according to an embodiment of the present disclosure. In other words, in FIG. 5, some components such as a first connection plate 155A, a second connection plate 155B and a fixing cover 158 are not depicted.

Referring to FIG. 5 along with FIG. 2, the connection cap 150 may include a cap housing 151, a first connection plate 155A, and a second connection plate 155B.

Here, the cap housing 151 may have an insulating material. In particular, a portion of the cap housing 151, which is in contact with the battery case 130, the cap assembly 140, the first connection plate 155A and the second connection plate 155B, may be made of an insulating material. Alternatively, the cap housing 151 may be made of an electrical insulating material. Here, the electrical insulating material may be, for example, polyvinyl chloride or polyethylene terephthalate.

Moreover, the cap housing 151 may be mounted to an upper portion of the battery case 130 and the cap assembly 140. The first connection plate 155A and the second connection plate 155B may be placed on the upper portion of the cap housing 151.

Specifically, the cap housing 151 may have an accommodation portion 152 formed at a top surface thereof to be recessed downward so that the first connection plate 155A and the second connection plate 155B are accommodated therein.

In addition, the cap housing 151 may have an outer sidewall 151C formed to surround at least a portion of the outer sidewall of the battery case 130.

Further, the circular outer circumference of the top end of the cap housing 151 may protrude and extend upward from the outer sidewall 151C of the cap housing 151.

More specifically, the accommodation portion 152 may include a first loading portion 152A, a second loading portion 152B, and a partitioning portion 152C.

Here, the first loading portion 152A may be formed at one side of the partitioning portion 152C to receive and fix the first connection plate 155A. Also, the first loading portion 152A may have an upper surface lower than the height of the upper surface of the partitioning portion 152C. That is, the upper surface of the first loading portion 152A and the upper surface of the partitioning portion 152C may form a step.

Further, the first loading portion 152A may have a shape or size corresponding to at least a partial appearance of the first connection plate 155A.

In addition, the second loading portion 152B may be formed at the other side of the partitioning portion 152C to receive and fix the second connection plate 155B. Also, the second loading portion 152B may have an upper surface lower than the height of the upper surface of the partitioning portion 152C. That is, the upper surface of the second loading portion 152B and the upper surface of the partitioning portion 152C may form a step.

Further, the second loading portion 152B may have a shape or size corresponding to at least a partial appearance of the second connection plate 155B.

In other words, the partitioning portion 152C may be formed between the first loading portion 152A and the second loading portion 152B to partition the first loading portion 152A and the second loading portion 152B. Also, the partitioning portion 152C may have an upper surface relatively higher than the first loading portion 152A and the second loading portion 152B. In addition, a barrier W may be formed between the first loading portion 152A and the partitioning portion 152C. Also, the barrier W may be formed to protrude and extend upward so as to electrically insulate the electrode terminal 112 and the first connection plate 155A.

Thus, according to this configuration of the present disclosure, the first connection plate 155A and the second connection plate 155B may be easily loaded in the accommodation portion 152 of the cap housing 151, and may also stably maintain the loaded state without movement even after being loaded. Thus, the first connection plate 155A and the second connection plate 155B may be smoothly bonded to the cylindrical battery cell 100 or a bus bar (not shown).

In addition, the cap housing 151 may have an outer circumferential exposing portion 153A and a central exposing portion 153B.

Here, the outer circumferential exposing portion 153A may be opened so that the first electrode terminal 111 formed at the outer circumference of the cylindrical battery cell 100 is exposed to the outside therethrough. Further, the outer circumferential exposing portion 153A may be opened so that the first connection plate 155A is electrically connected (contacted) with the first electrode terminal 111 directly.

Further, the outer circumferential exposing portion 153A may be opened at both ends thereof in the front and rear direction of the partitioning portion 152C so that a portion of the first electrode terminal 111 may be exposed. Thus, a portion of the first connection plate 155A loaded on the first loading portion 152A may be located on the first electrode terminal 111 without interference of the partitioning portion 152C.

In addition, the central exposing portion 153B may be opened so that the second electrode terminal 112 formed at the center portion of the top end of the cylindrical battery cell 100 is exposed to the outside therethrough. Further, the central exposing portion 153B may be formed so that the second connection plate 155B is electrically connected (contacted) with the second electrode terminal 112 directly.

Further, the central exposing portion 153B may be formed by opening the center of the partitioning portion 152C so that a portion of the second electrode terminal 112 is exposed. Also, there is no barrier between the central exposing portion 153B and the second loading portion 152B so that a portion of the second connection plate 155B loaded on the second loading portion 152B may be positioned on the second electrode terminal 112 without interference of the partitioning portion 152C, and the upper surface of the second electrode terminal 112 and the upper surface of the second loading portion 152B may be parallel to each other or the upper surface of the second electrode terminal 112 may be lower than the upper surface of the second loading portion 152B.

Thus, according to this configuration of the present disclosure, the cap housing 151 of the present disclosure may not only guide locations where the first connection plate 155A and the second connection plate 155B are disposed to be electrically connected to the first electrode terminal 111 and the second electrode terminal 112, respectively, but also fix the first connection plate 155A and the second connection plate 155B without movement during the welding process, thereby improving the welding efficiency.

Figure 6:
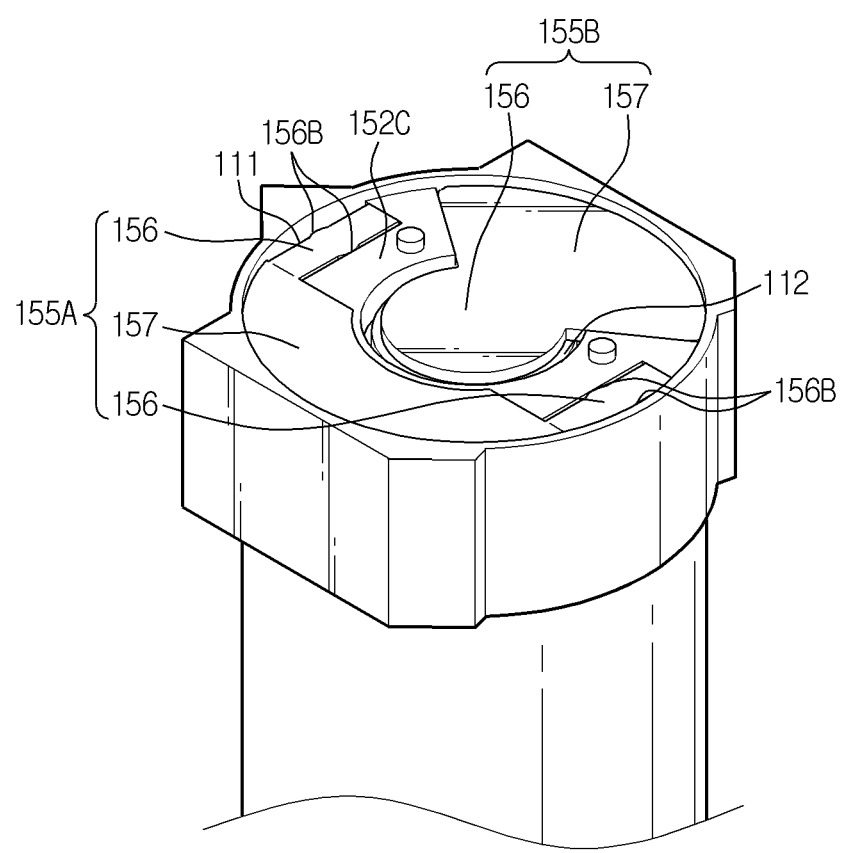
FIG. 6 is a partial perspective view schematically showing some components of the cylindrical battery cell according to an embodiment of the present disclosure.

FIG. 6 is a partial perspective view schematically showing some components of the cylindrical battery cell according to an embodiment of the present disclosure.

Referring to FIG. 6, the first connection plate 155A and the second connection plate 155B may include an electrode terminal welding portion 156 and a bus bar welding portion 157, respectively.

Specifically, the electrode terminal welding portion 156 may be positioned on the first electrode terminal 111 or the second electrode terminal 112 such that a lower surface thereof is in direct contact with the outer surface of the first electrode terminal 111 or the second electrode terminal 112.

In addition, the bus bar welding portion 157 may be connected to one end of the electrode terminal welding portion 156 so that a top surface thereof is exposed upward.

Moreover, the bus bar welding portion 157 may be located at one side or the other side based on the center of the top end of the cylindrical battery cell 100 so as to be electrically connected to a bus bar that electrically connects a plurality of cylindrical battery cells 100 in series or in parallel.

Further, the bus bar welding portion 157 may be a portion located at the top surface of the first loading portion 152A or the second loading portion 152B.

Figure 1:
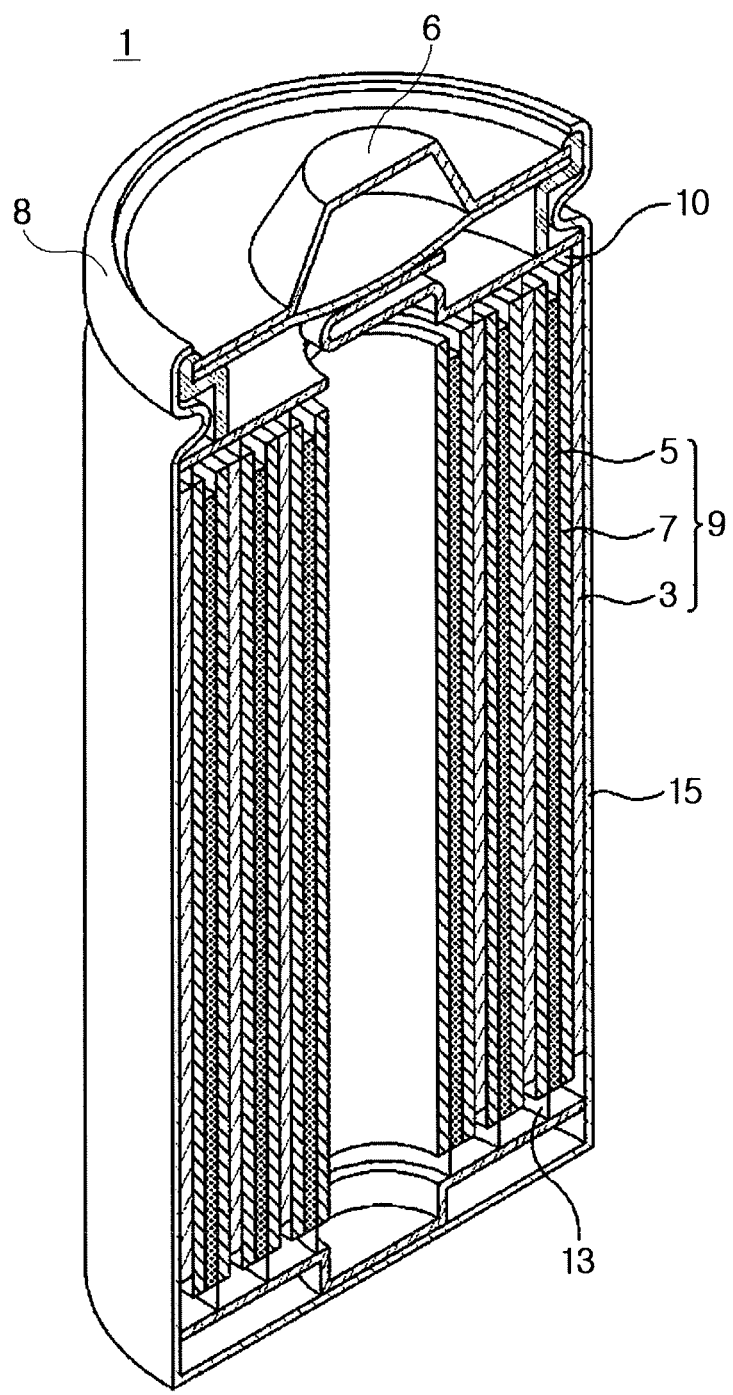
FIG. 1 is a schematic perspective view showing a section of a general cylindrical battery cell according to the prior art.

For example, as shown in FIGS. 5 and 6, when viewed in the F direction of FIG. 1, the bus bar welding portion 157 of the first connection plate 155A may be located on the first loading portion 152A, and the electrode terminal welding portion 156 may be formed to protrude and extend in the right direction at both front and rear ends of the bus bar welding portion 157.

Thus, the electrode terminal welding portion 156 of the first connection plate 155A may be located on the first electrode terminal 111 and be electrically connected or joined to the top surface of the first electrode terminal 111.

In addition, for example, as shown in FIGS. 5 and 6, when viewed in the F direction of FIG. 1, the bus bar welding portion 157 of the second connection plate 155B may be located on the second loading portion 152B, and the electrode terminal welding 156 protruding and extending in the left direction may be formed at the center of the bus bar welding portion 157. Thus, the electrode terminal welding portion 156 may be located on the second electrode terminal 112 and be electrically connected or joined to the top surface of the second electrode terminal 112.

Thus, according to this configuration of the present disclosure, since the first connection plate 155A and the second connection plate 155B have the electrode terminal welding portion 156 and the bus bar welding portion 157, the welding process between the electrode terminal and the connection plate and the welding process between the outer conductor and the connection plate may be easily performed.

That is, in the present disclosure, by using the first connection plate 155A and the second connection plate 155B, it is possible to effectively solve the problem that a welding defect occurs or a welding work becomes complicated due to a narrow width of the first electrode terminal 111 of the cylindrical battery cell 100.

Further, a convex portion 156B may be formed at the outer circumference of the electrode terminal welding portion 156 of the first connection plate 155A and the second connection plate 155B to protrude in the left and right direction or in the front and rear direction.

Specifically, the convex portion 156B may be formed so that the electrode terminal welding portion 156 is inserted into and fixed to the outer circumferential exposing portion 153A or the central exposing portion 153B of the cap housing 151. In addition, the convex portion 156B may be formed protrude outward at the outer circumferences of both sides of the electrode terminal welding portion 156 of the first connection plate 155A so as to be in close contact with the outer circumferential exposing portion 153A.

For example, referring to FIG. 6 along with FIG. 5, two convex portions 156B may be formed at the outer circumference of the electrode terminal welding portion 156 of the first connection plate 155A so that the electrode terminal welding portion 156 is inserted and fixed between the outer circumferential exposing portions 153A.

Thus, according to this configuration of the present disclosure, since the electrode terminal welding portion 156 of the first connection plate 155A and the second connection plate 155B may be stably inserted into the outer circumferential exposing portion 153A or the central exposing portion 153B of the cap housing 151, it is possible to increase the reliability of the welding process between the first electrode terminal 111 and the second electrode terminal 112 and between the first connection plate 155A and the second connection plate 155B and to reduce the defect rate.

Figure 7:
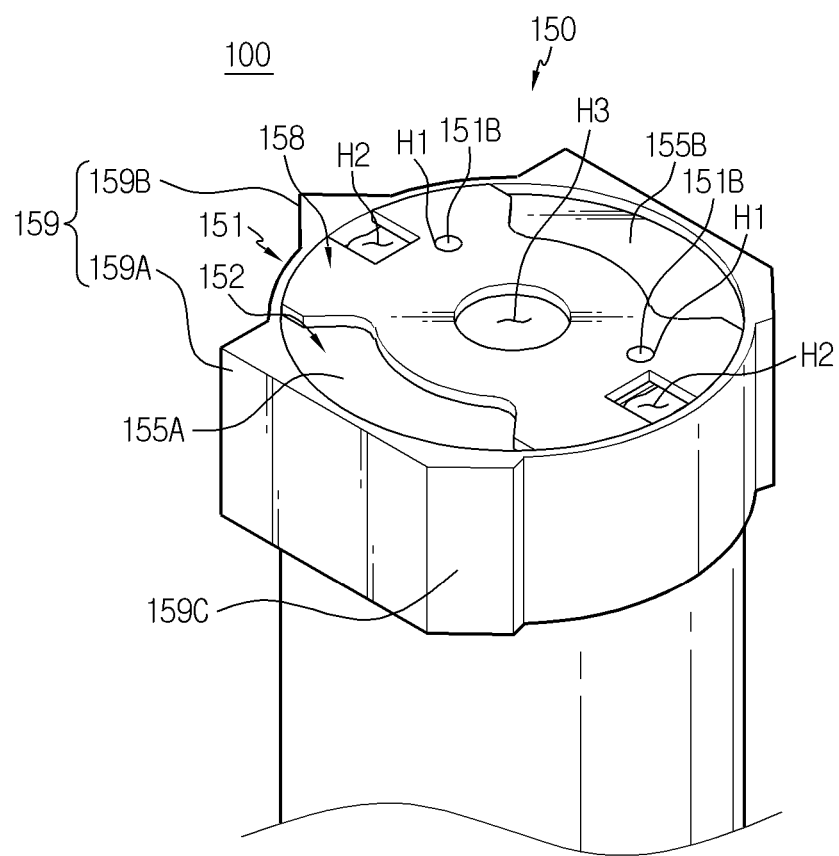
FIG. 7 is a partial perspective view schematically showing some components of the cylindrical battery cell according to an embodiment of the present disclosure.

FIG. 7 is a partial perspective view schematically showing some components of the cylindrical battery cell according to an embodiment of the present disclosure.

Referring to FIG. 7 along with FIG. 6, the connection cap 150 may further include a fixing cover 158 coupled and fixed to the cap housing 151.

Specifically, the fixing cover 158 may be configured to cover and fix a portion of the top surface of the first connection plate 155A and the second connection plate 155B.

Also, the cap housing 151 may be formed so that a guide protrusion 151B for guiding a fixed location of the fixing cover 158 protrudes upward. For example, as shown in FIG. 5, two guide protrusions 151B may be formed at the partitioning portion 152C of the cap housing 151 to protrude upward.

In addition, a fixing hole H1 may be formed at the fixing cover 158 to be opened so that the guide protrusion 151B is inserted therein. For example, as shown in FIG. 7, two fixing holes H1 may be formed at the fixing cover 158 so that the guide protrusion 151B is inserted therein.

Thus, according to this configuration of the present disclosure, since the fixing cover 158 may be fixed at a proper location just by inserting the guide protrusion 151B formed at the cap housing 151 into the fixing hole H1, it is possible to effectively increase the manufacturing efficiency.

Specifically, the fixing cover 158 may have an outer circumferential welding groove H2 and a central welding hole H3.

Here, the outer circumferential welding groove H2 may be opened so that the electrode terminal welding portion 156 of the first connection plate 155A is exposed to the outside. That is, the outer circumferential welding groove H2 may have a groove shape recessed inward at the outer circumference of the fixing cover 158.

For example, as shown in FIG. 7, the outer circumferential welding groove H2 may be formed at both ends of the fixing cover 158, which are in contact with the cap housing 151 of the fixing cover 158.

In addition, the central welding hole H3 may be opened so that the electrode terminal welding portion 156 of the second connection plate 155B is exposed to the outside. Specifically, the central welding hole H3 may be formed at the center of the fixing cover 158.

Thus, according to this configuration of the present disclosure, the fixing cover 158 may stably fix the first connection plate 155A and the second connection plate 155B to the accommodation portion 152 of the cap housing 151 effectively. In addition, since the outer circumferential welding groove H2 and the central welding hole H3 are formed, it is possible to smoothly perform a welding work between the first and second connection plates 155A, 155B and the first and second electrode terminals 111, 112.

Figure 8:
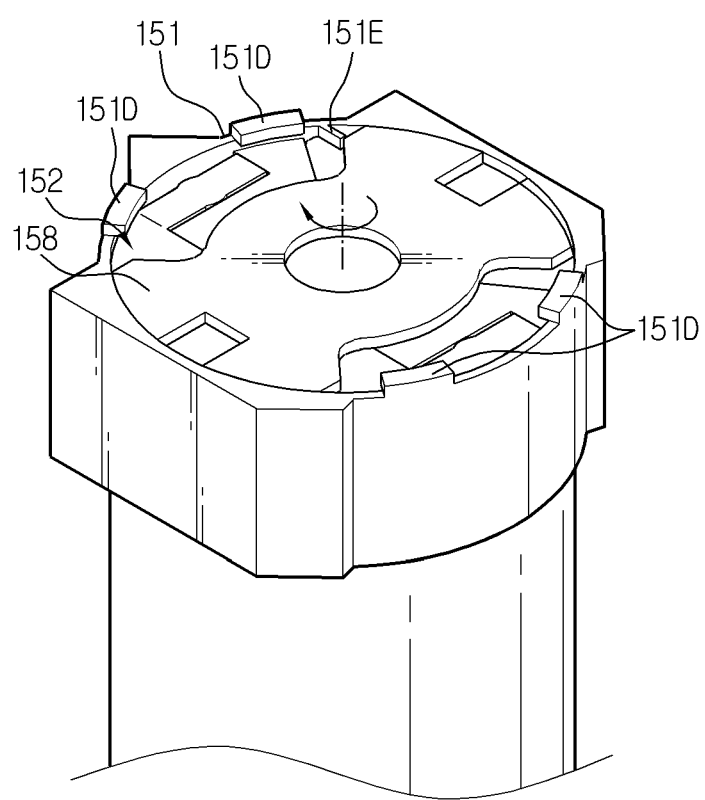
FIGS. 8 and 9 are partial perspective views for schematically illustrating a process of assembling some components of a cylindrical battery cell according to another embodiment of the present disclosure.
Figure 9:
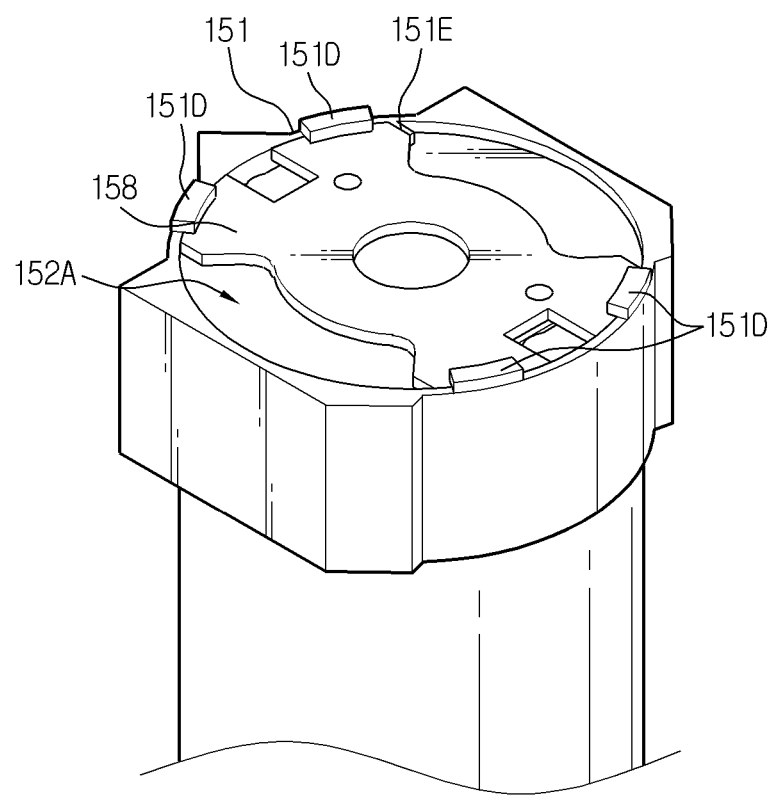

FIGS. 8 and 9 are partial perspective views for schematically illustrating a process of assembling some components of a cylindrical battery cell according to another embodiment of the present disclosure.

Referring to FIGS. 8 and 9, a hooking protrusion 151D may be formed at the accommodation portion 152 of the cap housing 151 to prevent components from deviating from the accommodation portion 152 to the outside.

Specifically, the hooking protrusion 151D may be formed at an inner surface of the accommodation portion 152 of the cap housing 151 to protrude toward the central. That is, the hooking protrusion 151D may be formed to protrude from the inner surface of the accommodation portion 152, which is in contact with the outer circumference of the top end of the cap housing 151. In other words, the hooking protrusion 151D may be formed to protrude from the top end of the circular outer circumference of the accommodation portion 152 of the cap housing 151 toward the center direction thereof.

Also, the fixing cover 158 may rotate clockwise or counterclockwise to be fixedly positioned below the hooking protrusion 151D, after being inserted into the accommodation portion 152 of the cap housing 151. In addition, a stopper 151E protruding inward to prevent rotational movement of the fixing cover may be formed at one end of the hooking protrusion 151D.

Thus, according to this configuration of the present disclosure, since the hooking protrusion 151D is separately formed at the cap housing 151 to fix the fixing cover 158, it is possible to stably fix the fixing cover 158 to the accommodation portion 152 of the cap housing 151. In addition, since the stopper 151E formed at one side may guide the fixing cover 158 to be fixed at an accurate position, it is possible to improve the accuracy of the welding work and reduce the defect rate later.

Figure 10:
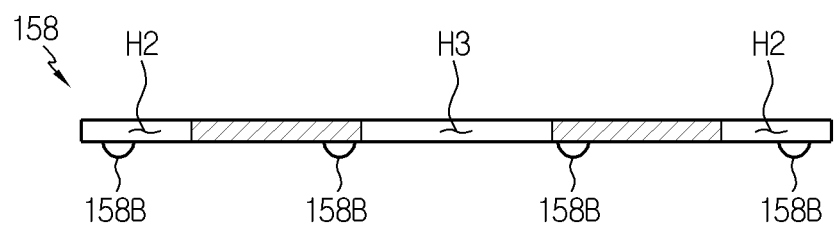
FIG. 10 is a cross-sectioned view schematically showing a fixing cover, employed at the cylindrical battery cell according to an embodiment of the present disclosure.

FIG. 10 is a cross-sectioned view schematically showing a fixing cover, employed at the cylindrical battery cell according to an embodiment of the present disclosure. At this time, FIG. 10 depicts that the center portion of the fixing cover 158 in the left and right direction is sectioned in the front and rear direction, when viewed in the F direction.

Referring to FIG. 10 along with FIGS. 6 and 7, a fixing protrusion 158B may be formed at a lower surface of the fixing cover 158.

Specifically, the fixing protrusion 158B may protrude to press a portion of the electrode terminal welding portion 156 of the first connection plate 155A downward. Moreover, the fixing protrusion 158B may protrude to press a portion of the electrode terminal welding portion 156 of the second connection plate 155B downward.

For example, as shown in FIG. 10, the fixing protrusion 158B may be provided in plural, and the plurality of fixing protrusions 158B may be formed to contact the electrode terminal welding portion 156 of the first connection plate 155A. In addition, the plurality of fixing protrusions 158B may be formed to contact the electrode terminal welding portion 156 of the second connection plate 155B.

Thus, according to this configuration of the present disclosure, since the fixing protrusion 158B presses the upper portion of the electrode terminal welding portion 156 of the first connection plate 155A and the second connection plate 155B, it is possible to closely adhere the first connection plate 155A and the second connection plate 155B to each other and the first electrode terminal 111 and the second electrode terminal 112 to each other. Thus, it is possible to increase the reliability of the welding connection between the first and second connection plates 155A, 155B and the first and second electrode terminals 111, 112.

Figure 11:
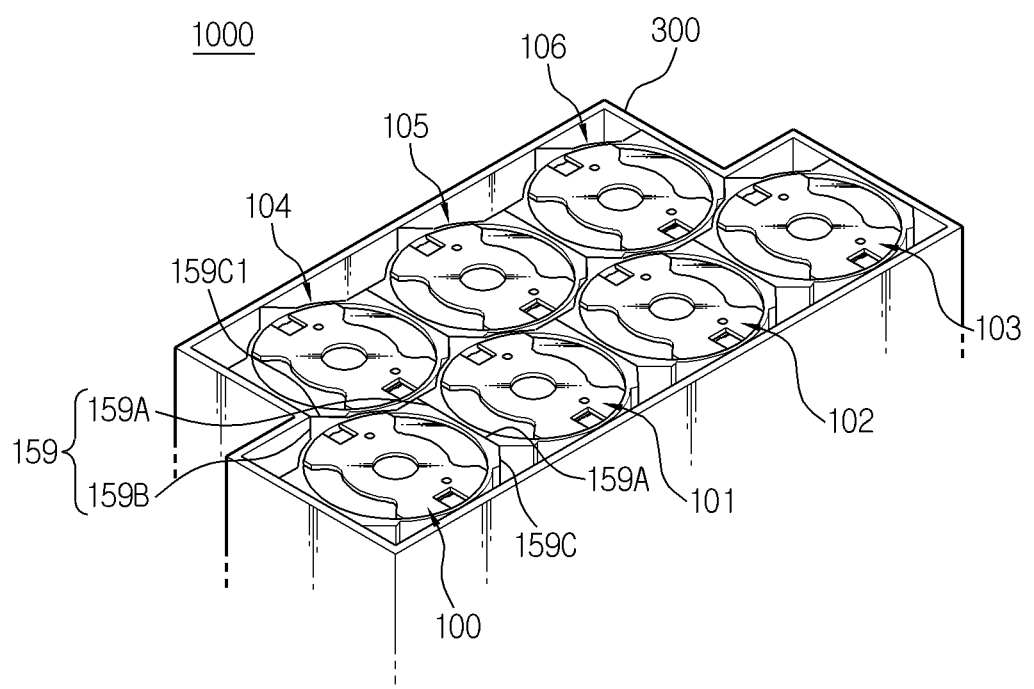
FIG. 11 is a partial perspective view schematically showing a battery module according to an embodiment of the present disclosure.

FIG. 11 is a partial perspective view schematically showing a battery module according to an embodiment of the present disclosure.

Referring to FIG. 11 along with FIG. 7, a battery module 1000 according to an embodiment of the present disclosure may include a plurality of the cylindrical battery cells 100. At this time, the cylindrical battery cells 100, 101, 102, 103, 104, 105, 106 may be arranged in the left and right direction and in the front and rear direction by means of an arrangement guiding portion 159 formed at the cap housing 151.

Here, an arrangement guiding portion 159 configured to guide the arrangement of the cylindrical battery cells 100, 101, 102, 103, 104, 105, 106 may be formed at the outer sidewall of the cap housing 151.

Specifically, the arrangement guiding portion 159 may have a flat ridge structure 159A and a triangular protruding structure 159B protruding from the outer sidewall of the cap housing 151.

Here, the flat ridge structure 159A may be formed to guide an arrangement of a plurality of cylindrical battery cells 100 in the left and right direction, when viewed in the F direction. Also, the flat ridge structure 159A may be a flat ridge structure 159A whose one side in the left and right direction is flatly ridged at the outer sidewall of the cap housing 151 in the left and right direction.

That is, another cylindrical battery cell 100 may arranged so that one surface of the flat ridge structure 159A at one side of the one cylindrical battery cell 100 faces one surface of the flat ridge structure 159A of the cap housing 151 of another cylindrical battery cell 100.

For example, as shown in FIG. 11, the cylindrical battery cells 100, 101, 102, 103 may be arranged in the left and right direction. At this time, each of the cylindrical battery cells 100, 101, 102, 103 may have the flat ridge structures 159A formed at both left and right sides of the cap housing 151, and the cylindrical battery cells 100, 101, 102, 103 may be arranged so that the flat ridge structures 159A thereof face each other.

In addition, the triangular protruding structure 159B may be formed to guide a plurality of cylindrical battery cells 100 to be arranged in the front and rear direction. Specifically, the triangular protruding structure 159B may be formed in a triangular prism shape at the outer sidewall of the cap housing 151 in the front and rear direction.

For example, as shown in FIG. 11, one triangular protruding structure 159B may be formed at the outer sidewall of the cap housing 151 in the front and rear direction.

In addition, the flat ridge structure 159A may have an inclined surface 159C (FIG. 7) so that the side portion of the cylindrical battery cell 100 arranged in the front and rear direction may be located to face the inclined surface 159C.

That is, at one side of one cylindrical battery cell 100 in the front and rear direction, another cylindrical battery cell 104 may be disposed so that one surface of the triangular protruding structure 159B formed on another cylindrical battery cell 100 arranged in the front and rear direction faces the inclined surface 159C1 (see FIG. 11) of the flat ridge structure 159A formed at another cylindrical battery cell 100.

For example, as shown in FIG. 11, one battery module 1000 may include a module housing 300 and cylindrical battery cells 100, 101, 102, 103, 104, 105, 106. In addition, four cylindrical battery cells 100, 101, 102, 103 are arranged in the module housing 300 in the left and right direction, and three cylindrical battery cells 104, 105, 106 may be disposed at the rear of the four cylindrical battery cells 100, 101, 102, 103.

At this time, three cylindrical battery cells 104, 105, 106 may be guided so that one surface of the triangular protruding structure 159B faces the inclined surface 159C of the flat ridge structure 159A formed at the one cylindrical battery cell 100, and thus the cylindrical battery cells 104, 105, 106 may be uniformly disposed at the rear of the cylindrical battery cells 100, 101, 102, 103.

Thus, according to this configuration of the present disclosure, the cylindrical battery cells may be uniformly and easily arranged in the left and right direction and in the front and rear direction by using the arrangement guiding portion 159 formed at the cylindrical battery cell 100.

In addition, the present disclosure may provide an electronic device that includes at least one battery module.

Specifically, the electronic device may include a case for accommodating the battery module. In addition, the electronic device may include a battery management unit (BMS) configured to control the battery module.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Reference Signs

100: cylindrical battery cell
111: first electrode terminal
112: second electrode terminal
120: electrode assembly
130: battery case
140: cap assembly
150: connection cap
151: cap housing
152: accommodation portion
153A: outer circumferential exposing portion
153B: central exposing portion
151B: guide protrusion
151E: hooking protrusion
155A: first connection plate
155B: second connection plate
156: electrode terminal welding portion
157: bus bar welding portion
158: fixing cover
H1: fixing hole
H2: outer circumferential welding groove
H3: central welding hole
159: arrangement guiding portion
159A: flat ridge structure
159B: triangular protruding structure
159C, 159C1: inclined surface

INDUSTRIAL APPLICABILITY

The present disclosure relates to a cylindrical battery cell and a battery module including a plurality of cylindrical battery cells. Also, the present disclosure is applicable to industries associated with an electronic device, an energy storage system or a vehicle, which includes the cylindrical battery cell or the battery module.

What is claimed is:

1. A cylindrical battery cell, comprising:
a first electrode terminal and a second electrode terminal having different polarities:
an electrode assembly in which a positive electrode, a negative electrode and a separator interposed between the positive electrode and the negative electrode are wound;
a battery case configured to include the electrode assembly therein in a state of being impregnated with an electrolytic solution;
a cap assembly mounted to a top end of the battery case; and
a connection cap including a cap housing loaded on the battery case and the cap assembly and having an insulating material, and a first connection plate and a second connection plate placed on the cap housing and electrically connected to the first electrode terminal and the second electrode terminal, respectively,
wherein the first connection plate and the second connection plate are located at a periphery of the connection cap, and on opposite sides of the connection cap.

2. The cylindrical battery cell according to claim 1, wherein the cap housing has an accommodation portion formed at a top surface thereof to be recessed downward so that the first connection plate and the second connection plate are accommodated therein.

3. The cylindrical battery cell according to claim 2, wherein the accommodation portion includes:
a first loading portion configured to accommodate and fix the first connection plate;
a second loading portion configured to accommodate and fix the second connection plate; and
a partitioning portion formed between the first loading portion and the second loading portion to partition the first loading portion and the second loading portion.

4. The cylindrical battery cell according to claim 3, wherein the connection cap further includes a fixing cover coupled and fixed to the cap housing to cover and fix a portion of a top surface of the first connection plate and the second connection plate.

5. The cylindrical battery cell according to claim 4, wherein the cap housing has a guide protrusion protruding upward to guide a fixed location of the fixing cover, and the fixing cover has a fixing hole formed to be opened so that the guide protrusion is inserted therein.

6. The cylindrical battery cell according to claim 4, wherein the fixing cover includes:
an outer circumferential welding groove opened so that an electrode terminal welding portion of the first connection plate is exposed to the outside; and
a central welding hole formed so that an electrode terminal welding portion of the second connection plate is exposed to the outside.

7. The cylindrical battery cell according to claim 4, wherein a hooking protrusion protruding toward a center of the cap housing is formed at the accommodation portion of the cap housing to prevent the fixing cover from deviating from the accommodation portion.

8. The cylindrical battery cell according to claim 2, wherein the cap housing includes:
an outer circumferential exposing portion opened so that the first electrode terminal formed at an outer circumference of the cap housing is exposed to the outside; and
a central exposing portion opened so that the second electrode terminal formed at a center portion of the cap housing is exposed to the outside.

9. The cylindrical battery cell according to claim 8, wherein the first connection plate and the second connection plate each includes:
an electrode terminal welding portion formed respectively at the first electrode terminal and the second electrode terminal so that a lower surface of the electrode terminal welding portion directly contacts an outer surface of the electrode terminal; and
a bus bar welding portion connected to one end of the electrode terminal welding portion so that a top surface of the bus bar welding portion is exposed upward.

10. The cylindrical battery cell according to claim 9, wherein the bus bar welding portion of each of the first connection plate and the second connection plate is located at the periphery of the connection cap.

11. The cylindrical battery cell according to claim 1,
wherein an arrangement guiding portion is formed at an outer wall of the cap housing to guide arrangement of a plurality of cylindrical battery cells.

12. The cylindrical battery cell according to claim 11, wherein the arrangement guiding portion includes flat ridge structures formed at outer walls of both left and right sides of the cap housing and having one flat surface in a left and right direction to guide arrangement of the plurality of cylindrical battery cells in the left and right direction, and
wherein a triangular protruding structure is formed at an outer sidewall of the cap housing in a front and rear direction to guide arrangement of the plurality of cylindrical battery cells in the front and rear direction.

13. A battery module, comprising a plurality of cylindrical battery cells according to claim 1.

14. An electronic device, comprising the battery module according to claim 13.

15. The cylindrical battery cell according to claim 1, wherein the first electrode terminal and the second electrode terminal are formed at a top outer circumference and a center portion of the cylindrical battery cell.

\* \* \* \* \*